United States Patent
Berlow (10) Patent No.: US 10,746,603 B2
(45) Date of Patent: Aug. 18, 2020

(54) OPTICAL DEVICE FOR OBTAINING 3D SPATIAL INFORMATION

(71) Applicant: Scoobe3D GmbH, Augsburg (DE)

(72) Inventor: Julian Berlow, Augsburg (DE)

(73) Assignee: Scoobe3D GmbH, Augsburg (DE)

( * ) Notice: Subject to any disclaimer, the term of this patent is extended or adjusted under 35 U.S.C. 154(b) by 0 days.

(21) Appl. No.: 16/326,105

(22) PCT Filed: Aug. 9, 2017

(86) PCT No.: PCT/EP2017/070173
§ 371 (c)(1),
(2) Date: Feb. 15, 2019

(87) PCT Pub. No.: WO2018/033446
PCT Pub. Date: Feb. 22, 2018

(65) Prior Publication Data
US 2019/0195691 A1  Jun. 27, 2019

(30) Foreign Application Priority Data
Aug. 17, 2016  (DE) .................. 10 2016 115 277

(51) Int. Cl.
*G01J 4/04* (2006.01)
*G01S 7/499* (2006.01)
(Continued)

(52) U.S. Cl.
CPC ............. *G01J 4/04* (2013.01); *G01N 21/21* (2013.01); *G01N 21/88* (2013.01); *G01S 7/484* (2013.01);
(Continued)

(58) Field of Classification Search
CPC .......... G01J 4/04; H04N 13/254; G01N 21/21; G01N 21/88; G01S 7/4816; G01S 7/484; G01S 7/486; G01S 7/499; G01S 17/89
(Continued)

(56) References Cited

U.S. PATENT DOCUMENTS 5,337,146 A * 8/1994 Azzam .................. G01J 3/189
250/225
5,850,284 A  12/1998 Schoeffler et al.
(Continued)

FOREIGN PATENT DOCUMENTS

DE  102013207148 A1  11/2013
GB  2515000 A  12/2014
WO  WO-2018033446 A1  2/2018

OTHER PUBLICATIONS

"International Application No. PCT/EP2017/070173, English translation of International Preliminary Report on Patentability dated Feb. 19, 2019", (Feb. 19, 2019), 9 pgs.
(Continued)

*Primary Examiner* — Roy M Punnoose
(74) *Attorney, Agent, or Firm* — Schwegman Lundberg & Woessner, P.A.

(57) ABSTRACT

An optical device, operating according to the time-of-flight principle, particularly for obtaining 3D spatial information and/or for detecting polarization-changing materials, comprising: a light-producing device comprising at least one light emitter for emitting light into a spatial area; a light-receiving device comprising at least one light detector that can be, or is, oriented towards the spatial area; a polarisation manipulator comprising at least one first optical modulator for influencing a polarisation of a light passing through the modulator and at least one polarization filter optically connected downstream of the modulator, where the first optical modulator is designed to generate at least three different (Continued)

polarisation states and/or where a superposition device is provided and designed such that at least three polarisation states can be generated, by time-division multiplexing; and an evaluation device for successive evaluation of the at least three polarisation states of the light passing through the polarisation manipulator.

12 Claims, 3 Drawing Sheets

(51) Int. Cl.
  *G01S 17/89* (2020.01)
  *G01S 7/481* (2006.01)
  *H04N 13/254* (2018.01)
  *G01N 21/21* (2006.01)
  *G01N 21/88* (2006.01)
  *G01S 7/484* (2006.01)
  *G01S 7/486* (2020.01)

(52) U.S. Cl.
  CPC ............ *G01S 7/486* (2013.01); *G01S 7/4816* (2013.01); *G01S 7/499* (2013.01); *G01S 17/89* (2013.01); *H04N 13/254* (2018.05); *G01N 2021/8848* (2013.01)

(58) Field of Classification Search
  USPC .......................................................... 356/369
  See application file for complete search history.

(56) References Cited

U.S. PATENT DOCUMENTS

| | | | |
|---|---|---|---|
| 6,924,893 B2* | 8/2005 | Oldenbourg | G02B 21/0004 356/369 |
| 2008/0218754 A1* | 9/2008 | Fest | F42C 13/023 356/369 |
| 2010/0128109 A1 | 5/2010 | Banks | |
| 2016/0146937 A1 | 5/2016 | Milione et al. | |

OTHER PUBLICATIONS

"International Application No. PCT/EP2017/070173, International Search Report and Written Opinion dated Nov. 22, 2017", (Nov. 22, 2017), 14 pgs.

Del Guasta, Massimo, et al., "Use of polarimetric lidar for the study of oriented ice plates in clouds", Applied Optics, vol. 45, No. 20, Jul. 10, 2006, (Jul. 10, 2006), 4878-4887.

* cited by examiner

Fig. 1

Fig. 2

# OPTICAL DEVICE FOR OBTAINING 3D SPATIAL INFORMATION

PRIORITY CLAIM TO RELATED APPLICATIONS

This application is a U.S. national stage filing under 35 U.S.C. § 371 of International Application No. PCT/EP2017/070173, filed on 9 Aug. 2017, and published as WO2018/033446 on 22 Feb. 2018, which claims priority to German Application No. 10 2016 115 277.3, filed on 17 Aug. 2016, the benefit of priority of each of which is claimed herein, and which applications and publication are hereby incorporated herein by reference in their entirety.

The invention relates to an optical device, preferably according to the light time-of-flight principle, in particular for obtaining items of 3D spatial information and/or for detecting polarization-changing materials, according to the claims, a metrological system or image processing system, and an optical method using the optical device.

BACKGROUND

Present 3D imaging methods and associated devices have numerous disadvantages. In laser-based systems and devices using structured illumination, high accuracies in the range of a few micrometers or even less are possible. In exchange, the systems are quite technically complicated and thus costly and also sometimes slow. The light time-of-flight method is more cost-effective, but has heretofore not been able to offer correspondingly high measurement accuracies, they are at best in the millimeter range here.

A depth image camera is known from DE 10 2013 207 148, which suppresses interfering light reflections by using polarization filters and thus increases the measurement accuracy. The resulting measurement accuracy is still comparatively low, however.

It is known in principle that the polarization properties of the light reflected from a surface enable inferences about the type of the reflection and the structure of the reflective surface (see, for example, GB 2 515 000 A1). This can be explained because depending on the angle of incidence of the incident light in relation to the surface normal of the irradiated object, sometimes all polarization states cannot all be reflected uniformly, which results in a partial polarization in the reflected light. This fact can be explained in that the reflection of light as an electromagnetic wave is dependent in particular on the movement of the electrons in the reflecting material. For certain angles of incidence and thus angles of reflection, these electrons oscillate along the emission direction. In this case, light cannot be emitted, since the nature of light to form a transverse wave has to be fulfilled.

Furthermore, methods are known in which the polarization properties of the light are recorded with the aid of a polarimeter (see, for example, US 2016/0146937 A1).

In summary, the following disadvantages occur in the prior art:
 inadequate measurement accuracy in light time-of-flight systems;
 expensive components; and
 large space requirement if polarimeters are used.

SUMMARY

It is the object of the present invention to propose an optical device, a metrological system or image processing system, and an optical method, wherein a high accuracy is to be achieved at comparatively low costs. In particular, cost-effective 3D imaging and/or detection of polarization-changing materials is to be enabled with comparatively high accuracy (in particular in the millimeter or micrometer range).

This object is achieved by an optical device according to the claims.

In particular, the object is achieved by an optical device, preferably according to the light time-of-flight principle, in particular for obtaining items of 3D spatial information and/or for detecting polarization-changing materials, comprising:
 a light generating unit, which has at least (or precisely) one light emitter for emitting (polarized or unpolarized) light into a spatial region;
 a light receiving unit, comprising at least (or precisely) one light detector, wherein the light detector and/or the light generating unit can be aligned or is aligned onto the spatial region;
 a polarization manipulator, comprising at least (or precisely) one first optical modulator for influencing a polarization of a light (originating from the spatial region) traversing the modulator and at least (or precisely) one polarization filter, which is connected optically downstream from the modulator, wherein the at least one first optical modulator is designed for generating at least two, preferably at least three different polarization states and/or wherein a superposition unit is provided and is designed in such a way that at least two, preferably at least three polarization states can be generated, in particular by time multiplexing; and
 an optional analysis unit for the in particular successive (occurring in succession) analysis of the at least three polarization states of the light passing through the polarization manipulator (and/or the light passing the polarization filter), in particular for obtaining 3D spatial information and/or for detecting polarization-changing materials.

One concept of the present invention is the use of the items of polarization information of the light reflected (or backscattered) from the surface of an object. In particular, multiple (3D) images can be recorded with the aid of the optical device, wherein a different polarization state can be highlighted in each case. The setting of the filtering of the polarization component can take place rapidly (in the range of microseconds, i.e., in particular 1 to 1000 µs or even nanoseconds, in particular 1 to 1000 ns), precisely, reliably, and with low maintenance. In this case, a central component can be seen in the optical modulator, which enables this rapid setting. A similar effect would theoretically also be achievable using the mechanical movement (rotation) of a (commercially-available) polarization filter. Such a mechanical movement (rotation) is not comparable and/or not sufficient with respect to the rapidity, precision, and reliability, however. There are also no other options known using which the required properties are enabled with respect to the setting of the transmitted component of the polarization.

One concept of the solution according to the invention is thus in particular that light incident on a filter is rotated in its polarization using an optical modulator (instead of rotating a polarization filter). Such a rotation can optionally be rotated back again by a further optical modulator after the filtering of the polarization. Overall, an optical device can thus be provided which enables an increase of the accuracy by rapid, precise, reliable, and low-maintenance filtering of the corresponding polarization component. The filtering is achieved in particular by a combination of an optical modulator (or multiple optical modulators) and the polarization filter (or multiple polarization filters). Furthermore, an option is provided by the device according to the invention of effectively influencing the contrast in a camera image during an image recording or between image recordings. This is particularly advantageous especially in image processing, since therefore in the event of a change of the corresponding examined object, the contrast can be adapted in an optical manner later (for example, via software command by a computer unit). A comparatively high level of flexibility and a comparatively stable application are thus enabled.

In summary, items of polarization information are advantageously obtained (for example, grayscale images) in dependence on the filtered polarization state. Rapid switching between the polarization states to be filtered is achieved in this case. This in turn enables an effective use of the items of polarization information in the (industrial) application.

A "polarization state" is to be understood in particular as a state of the polarization which is defined by the optical modulator or is generated by the superposition unit (for example, in that two different polarizations generated by the optical modulator are recorded in succession and are superimposed in such a way that an intermediate state, which can be understood as a third polarization state, is formed).

The above-mentioned object is furthermore achieved in particular by a polarization manipulator, preferably for an optical device of the above-described type, in particular for obtaining items of 3D spatial information and/or for detecting polarization-changing materials, comprising at least one optical modulator, preferably formed by a liquid crystal unit, for influencing a polarization of light traversing the modulator, and also at least one polarization filter, wherein at least two, preferably at least three, more preferably at least five different polarization states can be transmitted by the optical modulator and/or wherein a superposition unit is provided and is designed in such a way that at least two, preferably at least three, still more preferably at least five different polarization states can be generated, in particular by time multiplexing.

Reference is made to the above-described optical device with respect to the advantages.

Furthermore, the above-mentioned object is achieved in particular by a metrological system or image processing system, in particular for obtaining 3D spatial information and/or for detecting polarization-changing materials, which comprises an optical device of the above-described type and/or a polarization manipulator of the above-described type.

Furthermore, the object is achieved in particular by a method, in particular for obtaining 3D spatial information and/or for detecting polarization-changing materials using an optical device of the above-described type and/or a polarization manipulator of the above-described type and/or a metrological system or image processing system of the above-described type, wherein the analysis unit preferably simulates at least one intermediate state between different polarization states, in particular via time multiplexing. Alternatively or additionally, the intermediate state can be achieved by a corresponding selection of the exposure times and activation times of the optical modulator.

The above object is furthermore achieved in particular by a method (preferably according to the light time-of-flight principle) for obtaining 3D spatial information and/or for detecting polarization-changing materials (preferably using an optical device of the above-described type)
  wherein light is generated by a light generating unit, wherein at least one light emitter of the light generating unit emits light into a spatial region,
  wherein light is received by a light receiving unit, wherein at least one light detector of the light receiving unit is or becomes aligned on the spatial region;
  wherein a polarization manipulator, comprising at least one first optical modulator, influences a polarization of light traversing the modulator, wherein at least one polarization filter is connected optically downstream from the first optical modulator, wherein the first optical modulator generates at least three different polarization states and/or wherein a superposition unit is provided, which generates at least three polarization states, in particular by time multiplexing; and
  wherein optionally an analysis unit analyzes at least three polarization states, in particular successively, of the light passing through the polarization manipulator (and in particular obtains 3D spatial information and/or detects polarization-changing materials therefrom).

Further optional method steps result from the description above and hereafter, in particular from the described functional features, which can be implemented with respect to the method by corresponding method steps.

The above-mentioned object is furthermore achieved in particular by the use of an optical device of the above-described type and/or a polarization manipulator of the above-described type and/or a metrological system or image processing system of the above-described type and/or a method of the above-described type for obtaining 3D spatial information and/or for detecting polarization-changing materials.

Further preferred embodiments are the subject matter of the dependent claims and/or following parts of the description.

The polarization manipulator (between the polarization filter and the light receiving unit) preferably comprises at least one second optical modulator. The at least one second optical modulator furthermore preferably is aligned or can be aligned in relation to the first optical modulator in such a way that its slow axis encloses an angle of 0° (or 180°) or 90° with the slow axis of the first optical modulator. The polarization can thus be rotated back after rotation and filtering (at least partially, at an arbitrary angle), so that the effect of a pivot of a standard polarization filter by 90° can optionally be approximated or (identically) simulated. The influence of the optical modulation unit is thus restricted to carrying out filtering after the polarization and no permanent rotation (which is actually unnecessary and/or possibly even undesired) of the polarization is effectuated. This is advantageous in particular if the light detector has a polarization-dependent sensitivity.

In one preferred embodiment, at least one camera, preferably at least one light time-of-flight camera (in particular a PMD camera, preferably comprising a PMD sensor, in particular a PMD chip, wherein PMD stands for photonic mixing device), is provided, which furthermore preferably has the at least one light detector. Images supplied from a light time-of-flight already include items of distance information, because of which they can also be referred to as 3D images. The use of a light time-of-flight camera in the device according to the invention is advantageous in particular because in this manner 3D images can be obtained having an accuracy in the micrometer range (1 μm to 1000 μm) or even nanometer range (1 nm to 1000 nm) (for example, 1 nm-1000 µm, preferably 1 nm-500 µm, still more preferably 1 nm-200 µm, still more preferably 1 nm-1000 nm).

In one embodiment, a further polarization manipulator constructed inversely, in particular with respect to the sequence of the components (i.e., in particular with respect to the sequence of optical modulator and polarization filter) is arranged (directly and/or at a small distance of, for example, less than 10 mm) in front of the light generating unit. Such a further (second) polarization manipulator can be aligned in such a way that light firstly passes through the polarization filter and subsequently through the optical modulator. In particular if optically active materials are illuminated and examined, the incident polarization is changed by the optically active material. In this case, this means that in the case of incident (unpolarized) light, the analysis unit possibly cannot obtain reliable analyses from the polarization-dependent images of the light receiving unit, since the change of the polarization can be induced both by the geometrical shape of the reflecting object and also by the optically active material (and thus possibly cannot be unambiguously assigned). In this case, the use of the polarization manipulator in front of the light generating unit is particularly advantageous, since all of the polarization information can furthermore be separated and processed here.

In an alternative embodiment, the light generating unit emits polarized light (or light having a preferential direction, which is clear in particular, in the polarization). In a further preferred embodiment, the light generating unit emits unpolarized light (or light without direction, which is clear in particular, in the polarization). Especially if unpolarized light is used, a rapid and precise determination of the desired items of information can be performed.

In one embodiment, the at least one light emitter is formed by (at least one) laser. This is particularly advantageous in particular in the case of greater distances, since lasers generate strong light which can be collimated well. According to an alternative embodiment, the at least one light emitter is formed by at least one LED, preferably by at least 10 LEDs, more preferably by at least 100 LEDs. The light generating unit (in particular the LEDs) is preferably operated in a pulsed and/or modulated manner (particularly preferably according to the PMD principle) (wherein a corresponding pulse generating unit and/or modulating unit can be provided). Due to a pulsed operation of the LEDs, they can (briefly) absorb a higher current, whereby greater luminosities are possible. A comparatively large number of LEDs enables a homogeneous illumination of the reflecting object, whereby larger objects can also be acquired in their geometrical shape. Furthermore, it is advantageous that a pulsed operation of the LED illumination and/or the flashing of the LEDs reduces the influence of external light, which does not originate from the light generating unit, and the quality of the image information is thus enhanced.

The at least one optical modulator preferably comprises a liquid crystal arrangement, which is electrooptically controlled in particular, or consists thereof. This has the advantage that the rotation of the polarization can be performed very rapidly and reliably. Alternatively or additionally, the at least one optical modulator can comprise at least (or precisely) one electrooptical and/or at least (or precisely) one magnetooptical and/or at least (or precisely) one acoustooptical apparatus.

The polarization manipulator preferably comprises (in front of the light entry) a quarter-wave plate. This enables a use of circularly polarized light (instead of linearly polarized light). Alternatively or additionally, a parallelization optical unit for parallelization of entering light beams can be arranged in front of the polarization manipulator.

The at least one optical modulator has (in an active state) a slow axis, which is preferably designed in such a way that it is aligned or can be aligned perpendicularly to the light propagation direction and/or at a 45° angle to the transmission direction of the polarization filter. In this case, the optical modulator (in the active state) preferably acts like a half-wave plate. Furthermore, the at least one optical modulator (in an active state) can have a slow axis, which is preferably designed in such a way that it is aligned or can be aligned in the longitudinal direction (i.e., in particular in the direction of the propagation of the light passing through it), wherein the optical modulator furthermore preferably enables a (continuous) phase shift (and thus polarization rotation).

The optical device can have a control unit for the (time-dependent) control of the optical modulator. At least or precisely two, preferably at least or precisely three, furthermore preferably at least or precisely five polarization states can thus be transmitted by the optical modulation unit within a specific duration.

Overall, the image recording for multiple different polarization states is enabled according to the present invention, wherein one image can be recorded per polarization state. This is advantageous because all items of polarization information contained in the light can be recorded (in succession) and possibly individual images can be processed (separately from one another), so that effective utilization of the information is enabled. Furthermore, redundancies can thus optionally be generated, which enable more accurate and reliable items of information to be obtained from an algorithm processing the images.

The analysis unit is preferably for the (time) multiplexing of various polarization states, in particular for simulating an intermediate polarization state predetermined by the various polarization states. Alternatively or additionally, the intermediate state can be achieved by a corresponding selection of the exposure times (in particular of a camera) and activation times of the optical modulator. For example, such an intermediate state can be generated in that over a first time span (for example, 50%) of an exposure phase (of a camera), the modulator is in a first state and in a second time span of the same exposure phase, it is in a second state, wherein the modulator can be switched accordingly for this purpose in particular.

The invention generally relates to a polarization modulator having at least one optical modulator, preferably formed by a liquid crystal unit and a polarization filter. This polarization manipulator effectuates filtering according to the polarization state for light passing through it and can filter according to at least two polarization states. If necessary, a simulation of one intermediate state or multiple intermediate states is possible by time-dependent recombination of the two polarization states. This is advantageous if rapid, precise, reliable, and low-maintenance filtering according to polarization, which may preferably be controlled in electronically switched manner, is desired under arbitrary circumstances.

According to a further advantageous embodiment of the present invention, the polarization manipulator additionally contains a quarter-wave plate in front of the light entry and/or directly in front of the light exit. This enables a use of circularly polarized light instead of working with linearly polarized light.

According to one advantageous embodiment of the present invention, the optical device is embedded in a metrological system or image processing system, which enables items of information to be obtained and/or to be (expediently) processed on the basis of the optical data.

According to the method according to the invention, this optical device can be used, inter alia, to obtain items of 3D information about the object reflecting the light and also to improve the accuracy of known 3D imaging methods, for example, the light time-of-flight method.

The at least one modulator (or all optical modulators) is (are) preferably controllable (for example, electrically controllable from an inactive into an active state or multiple active states).

The invention will be explained in greater detail hereafter on the basis of exemplary embodiments illustrated in the appended figures.

DETAILED DESCRIPTION

Figure 1:
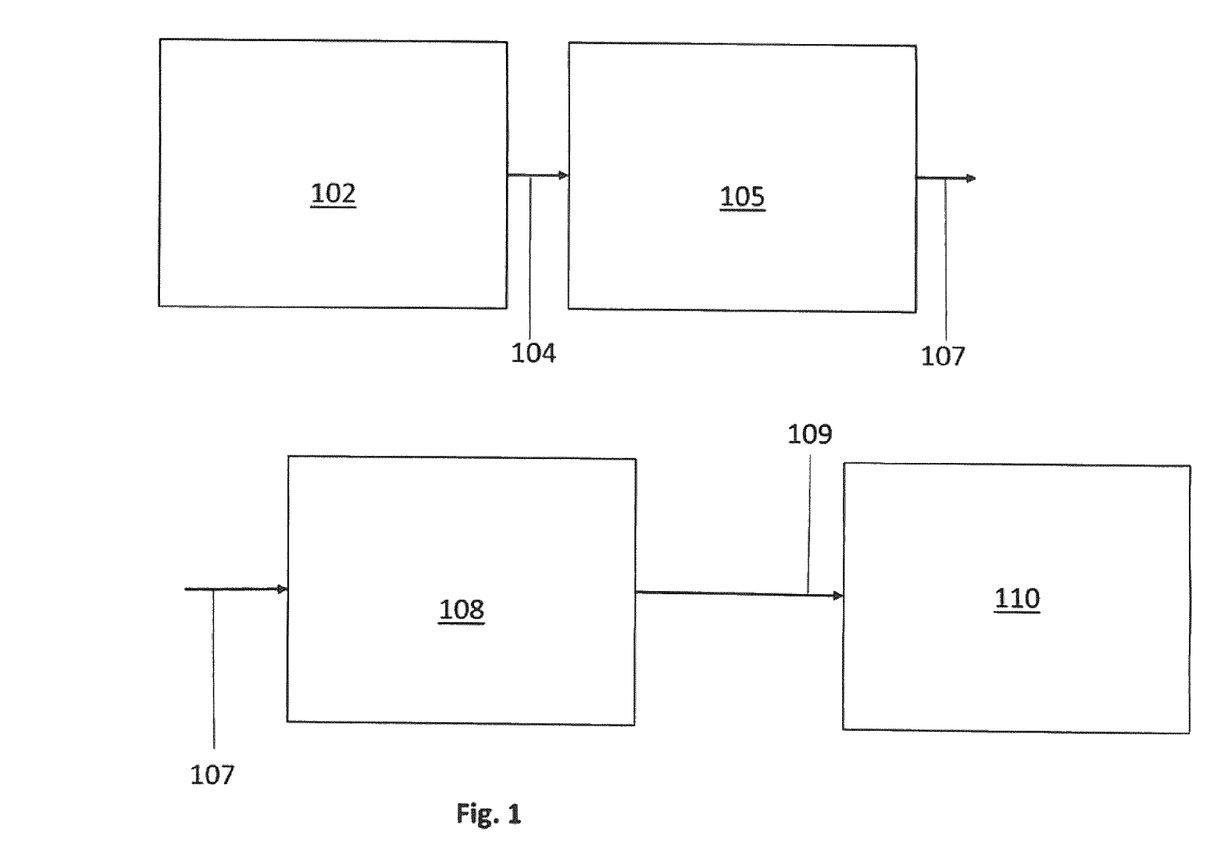
FIG. 1 shows a block diagram, which illustrates the device according to the invention by way of example during the detection of a remote object.

Firstly, the fundamental configuration of the optical device according to the invention is illustrated according to FIG. 1. The optical device comprises a light generating unit 102, which, in this exemplary and nonexclusive, preferred embodiment, casts unpolarized light 104 onto a (remote) object 105. The object 105 reflects part of the light in the direction of the optical device and especially in the direction of a polarization manipulator 108. In this case, the object 105 changes the polarization characteristic of the light in accordance with its spatial structure and in accordance with its material. The light component 107 returning in the direction of the device according to the invention therefore has a different polarization characteristic than the originally emitted light 104. The polarization manipulator 108 filters the incident light (in an electrically controlled manner) according to its polarization direction and relays the resulting polarized light 109 to the light receiving unit 110.

Figure 2:
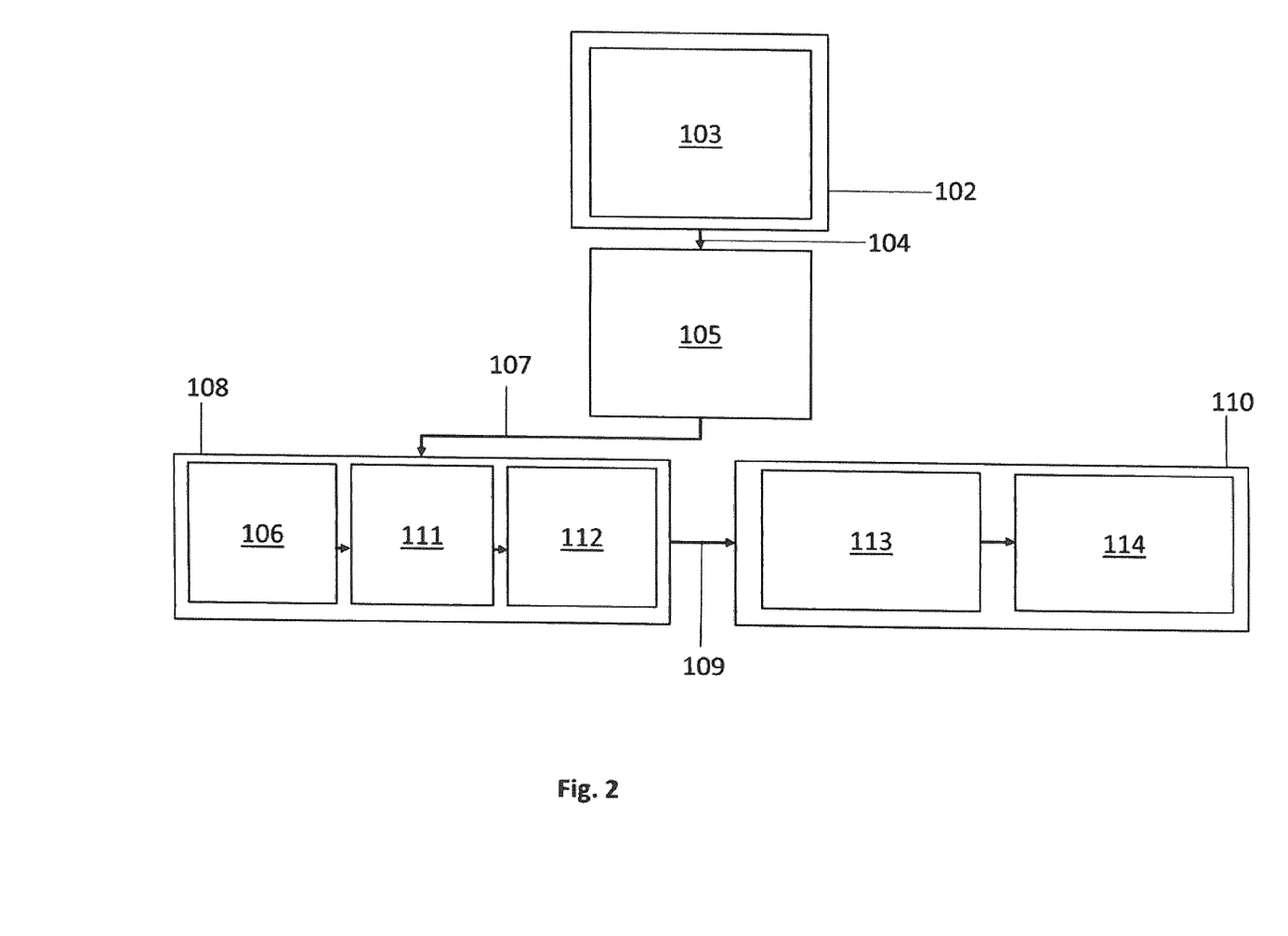
FIG. 2 shows the block diagram from FIG. 1 in detail.

The device according to the invention is illustrated in greater detail in FIG. 2. The light generating unit 102 contains in this case (only) one LED array 103. In addition, a diffuser (for example, a diffuser film) to make the light more diffuse and/or a polarization filter could also be installed in front of the LED array. The two are not shown in FIG. 2. A diffuser (a diffuser film) is recommended depending on the emission characteristics of the LEDs and the material of the (remote) object 105. A polarization filter is recommended, for example, if the material of the remote object 105 is optically active or has a strongly diffuse surface. In this exemplary, but not exclusive embodiment of the device according to the invention, neither a diffuser film nor a polarization filter is used in the light path between the LED 103 and the (remote) object 105, because of which the emitted light 104 can be considered to be unpolarized (and slightly oriented).

The object 105 casts, for example, (partially) polarized light 107 in the direction of the optical modulation unit 108. This is constructed in the illustrated exemplary embodiment from an optical modulator 106, a (linear) polarization filter 111, and a further optical modulator 112, which can be designed identically to the optical modulator 106. Incident light passes through the mentioned elements in the sequence they are mentioned. The crystal-optical (slow) axes of the optical modulators 106, 112, if they are active, are both in a plane perpendicular to the incidence of the light. In addition, the polarization filter 111 is aligned horizontally and the slow axes of the optical modulators each enclose an angle of 45° with the transmission direction of the polarization filter. The slow axes of the activated optical modulators are congruent in this exemplary embodiment. In another, preferred embodiment, the slow axis of the at least one optical modulator is located in the longitudinal direction in relation to the light path. The alignment of slow axes of the optical modulator or modulators and thus also the further description of the exemplary embodiment are thus not to be considered to be exclusive.

Figure 3:
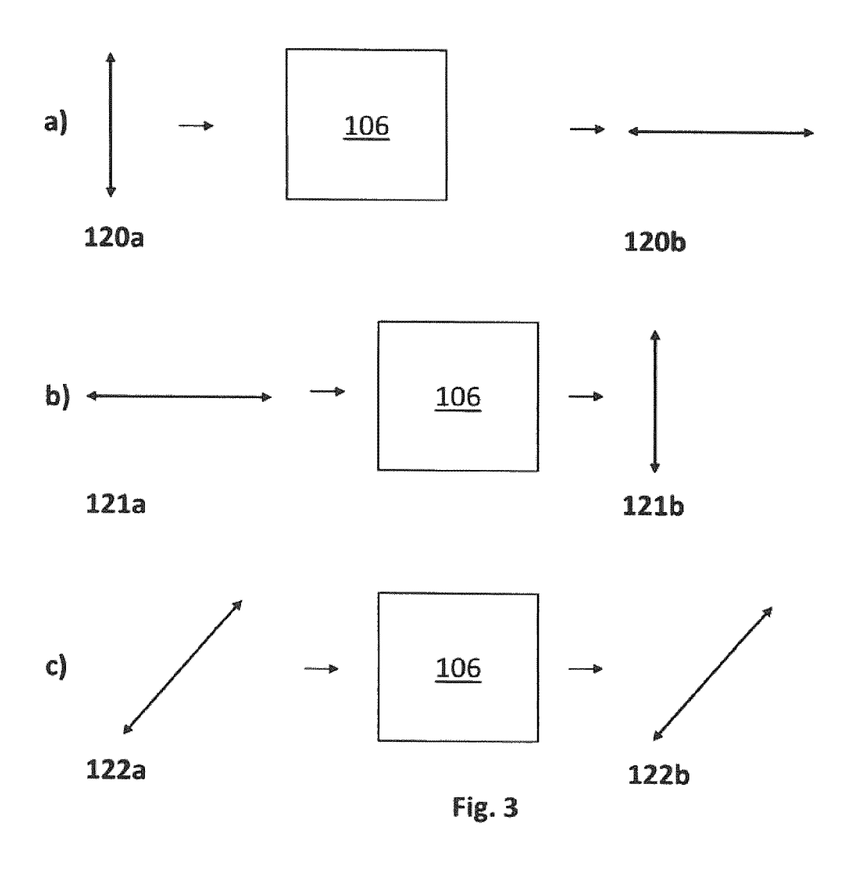
FIG. 3 shows the effect of the optical modulator on the light with the respective incident polarization direction.

The effect of the optical modulator 106 for various cases of the polarization in the incident light is illustrated in FIG. 3. For vertically polarized light 120a, FIG. 3a shows the effect of the activated optical modulator 106, which reacts here like a half-wave plate. In this case, the angle of 45° between the polarization plane of the incident light and the slow axis of the activated optical modulator 106 is decisive. The mentioned optical modulator 106 always rotates the polarization plane of the light passing through it by twice the mentioned angle, which results for the vertical polarization plane 120a from FIG. 3a in a rotation by 90° and thus in exiting light having a horizontal polarization 120b.

FIG. 3b shows the effect of the activated optical modulator on incident light having horizontal polarization 121a. This is also rotated by 90° and vertically polarized light 121b exits.

FIG. 3c shows the case between the incident radiation with vertical polarization from FIG. 3a and the incident radiation with horizontal polarization. Since in this case the slow axis of the activated optical modulator 106 is in the polarization plane, no rotation of the latter takes place and the incident light 122a exits without change of the polarization. The resulting, similarly unchanged polarization plane is identified by 122b.

Overall, it may be stated that the light entering the optical modulator 106 is rotated by the corresponding angle in dependence on the polarization plane of the respective radiation component. It is also to be noted that the optical modulator 106 has no effect on the polarization in the inactive state.

Returning to FIG. 2, it is apparent that the light propagating through the optical modulator 106 is incident on the horizontally aligned polarization filter 111. It is apparent therefrom in particular that due to the combination of activated optical modulator 106 and polarization filter 111, only the light components having originally vertical polarization plane are rotated in a matching manner in their polarization and can thus overcome the polarization filter 111. Specifically, this means that the case illustrated in FIG. 3b of the incident light having horizontal polarization 121a is (nearly completely, in particular by at least 80%, preferably by at least 90%) blocked. In the case illustrated in FIG. 3c, the light is proportionally filtered, wherein also only the horizontally polarized component goes through the polarization filter 111 here. Finally, neglecting other absorption effects, only the light component of the incident radiation shown in FIG. 3a having vertical polarization 120a can thus pass without restriction.

The second optical modulator 112 in FIG. 2 is used to compensate again for the rotation of the polarization plane induced by the first modulator 106. This is advantageous if the light-sensitive chip 114 has a polarization dependence. The (complete) polarization manipulator 108 can therefore overall supply the same result which one would also obtain upon a manual, mechanical rotation of the polarization filter 111. In contrast thereto, however, this polarization manipulator is electrically controllable very rapidly. The second optical modulator 112 is to be considered to be optional, since, for example, CCD chips typically do not have a polarization dependence.

The light receiving unit 110 of the device according to the invention can furthermore contain an imaging optical unit 113 and a light-sensitive chip 114, for example, as CCD chip or also a PMD chip, which is more practical for the light time-of-flight method. These enable the generation of image data on the basis of the light 109 filtered in its polarization.

In summary, the polarization manipulator can thus filter according to the two states orthogonal to one another in this example, more precisely according to light having horizontal polarization with inactive optical modulator and according to light having vertical polarization with active optical modulator. However, all interposed, linear polarization states can potentially be simulated (via time multiplexing) from these states. For example, the polarization 122a shown in FIG. 3c can be filtered by the optical modulators 106 and 112 being inactive half of the exposure time and active the other half during the exposure time of the light-sensitive chip 114. This switching has the advantage of being able to use more cost-effective components. In return, it is possible here that actual polarization states to be filtered partially nonetheless have effects.

In a further preferred embodiment of the illustrated invention, which is not shown in the drawings, at least or precisely one optical modulator can be used so that, if it has a slow axis, this crystal-optical axis lies in the longitudinal, i.e., in the propagation direction of the light passing through it. This is advantageous since a continuous modulation of the phase becomes possible here, and the rotation of the polarization plane is thus also continuously adjustable. In return, the polarization manipulator is more technically complex, for example, if the optical modulator is formed by a Pockels cell, the electrodes have to be made transparent.

In a further preferred embodiment of the illustrated invention, the at least one optical modulator is represented by an electrooptical and/or by a magnetooptical and/or by an acoustooptical apparatus.

LIST OF REFERENCE SIGNS

102 light generating unit
103 LED array
104 (unpolarized) light
105 (remote) object
106 optical modulator
107 (returning) light component
108 polarization manipulator
109 (polarized) light
110 light receiving unit
111 (linear) polarization filter
112 (further) optical modulator
113 imaging optical unit
114 (light-sensitive) chip
120a (vertically polarized) light
120b (horizontally polarized) light
121a (horizontally polarized) light
121b (vertically polarized) light
122a (incident) light
122b (resulting) light

The invention claimed is:

1. An optical device for obtaining 3D spatial information, the optical device comprising:
    a light generating unit, comprising at least one light emitter for emitting light into a spatial region;
    a light receiving unit, comprising at least one light detector, which can be aligned or is aligned on the spatial region;
    a polarization manipulator, comprising at least one first optical modulator for influencing a polarization of light traversing the first optical modulator and at least one polarization filter, which is connected optically downstream of the first optical modulator, wherein the first optical modulator is configured to generate at least three different polarization states or wherein the polarization manipulator includes a superposition unit is configured to generate at least three polarization states, by time multiplexing; and
    an analysis unit for analysis, which is successive, of the at least three polarization states of the light passing through the polarization manipulator.

2. The optical device according to claim 1,
    wherein the polarization manipulator comprises, between the polarization filter and the light receiving unit, at least one second optical modulator, which is aligned or can be aligned in relation to the first optical modulator in such a way that a slow axis of the second optical modulator encloses an angle of 0° or 180° or 90° with a slow axis of the first optical modulator.

3. The optical device according to claim 1,
    wherein the at least one light detector includes at least one light time-of-flight camera.

4. The optical device according to claim 1,
    wherein a further polarization manipulator, which is constructed inversely with respect to the first optical modulator and polarization filter, is arranged in front of the light generating unit.

5. The optical device according to claim 1,
    wherein the light generating unit emits polarized light or light having a preferential direction in the polarization, or the light generating unit emits unpolarized light or light without a preferential direction in the polarization.

6. The optical device according to claim 1,
    wherein the at least one light emitter comprises a laser or at least one LED.

7. The optical device according to claim 1,
    wherein the at least one first optical modulator comprises a liquid crystal arrangement which is electrooptically controlled, or comprises at least one magnetooptical apparatus or comprises at least one acoustooptical apparatus.

8. The optical device according to claim 1, further comprising a quarter-wave plate or a parallelization optical unit arranged in front of the polarization manipulator.

9. The optical device according to claim 1,
    wherein the at least one optical modulator has, in an active state, a slow axis, which is aligned or can be aligned perpendicularly to the light propagation direction or at a 45° angle to a transmission direction of the polarization filter, and wherein the optical modulator acts like a half-wave plate in the active state,
    or wherein the at least one optical modulator has, in an active state, a slow axis, which is aligned or can be aligned in the longitudinal direction, and wherein the optical modulator enables a continuous phase shift.

10. The optical device according to claim 1, further comprising a control unit configured for controlling the optical modulator, or wherein the optical device is configured for time multiplexing of various polarization states, and configured for simulating an intermediate polarization state predetermined by the various polarization states.

11. A polarization manipulator for an optical device according to claim 1, the polarization manipulator comprising at least one optical modulator, including a liquid crystal unit configured for influencing a polarization of light traversing the modulator, and at least one polarization filter, wherein at least three different polarization states can be transmitted by the optical modulator, or wherein a superposition unit is provided and is configured such that at least three polarization states can be generated by time multiplexing.

12. An optical device for detecting polarization-changing materials, the optical device comprising:
- a light generating unit, comprising at least one light emitter for emitting light into a spatial region;
- a light receiving unit, comprising at least one light detector, which can be aligned or is aligned on the spatial region;
- a polarization manipulator, comprising at least one first optical modulator for influencing a polarization of light traversing the first optical modulator and at least one polarization filter, which is connected optically downstream of the first optical modulator, wherein the Ofirst optical modulator is configured to generate at least three different polarization states or wherein the polarization manipulator includes a superposition unit is configured to generate at least three polarization states, by time multiplexing; and
- an analysis unit for analysis, which is successive, of the at least three polarization states of the light passing through the polarization manipulator.

* * * * *